United States Patent [19]

Hannum

[11] 4,394,161
[45] Jul. 19, 1983

[54] METHOD OF PRODUCING A VANADIUM- AND NITROGEN-CONTAINING MATERIAL FOR USE AS AN ADDITION TO STEEL

[75] Inventor: Roy R. Hannum, Long Bottom, Ohio

[73] Assignee: Union Carbide Corporation, Danbury, Conn.

[21] Appl. No.: 393,228

[22] Filed: Jun. 28, 1982

[51] Int. Cl.³ .............................................. C22B 34/00
[52] U.S. Cl. ................................... 75/0.5 BC; 75/84; 75/129
[58] Field of Search ............... 75/0.5 BC, 60, 59, 129, 75/84

[56] References Cited

U.S. PATENT DOCUMENTS

| 3,230,075 | 1/1966 | Nakamura | 75/59 |
| 3,257,197 | 6/1966 | Death | 75/59 |
| 3,334,992 | 8/1967 | Downing | 75/129 |
| 4,040,814 | 8/1977 | Merkert | 75/129 |

Primary Examiner—P. D. Rosenberg
Attorney, Agent, or Firm—John R. Doherty

[57] ABSTRACT

A method for producing a vanadium- and nitrogen-containing material ($V_2N$) in which nitrogen gas is introduced into a furnace containing a mixture of $V_2O_3$ and carbon in stoichiometric proportion while simultaneously maintaining the temperature in the furnace in a range of from about 1000° C. to 1500° C. under a reduced pressure in the range of from about 5 mm to 100 microns.

1 Claim, No Drawings

METHOD OF PRODUCING A VANADIUM- AND NITROGEN-CONTAINING MATERIAL FOR USE AS AN ADDITION TO STEEL

TECHNICAL FIELD

The present invention is directed to an improved method for producing a vanadium- and nitrogen-containing material for use as an addition to steel.

In the manufacture of high strength, low alloy steels such as tool steels and the like, significant amounts of vanadium are utilized as an alloying constituent in order to improve the properties of the steel. For example, vanadium additions are widely used to provide toughness and strength and also to aid in stabilizing steels.

It is also desirable at times to add substantial amounts of nitrogen to molten steel, in addition to vanadium. Such additions have been made in the past by utilizing a material containing both vanadium and nitrogen in proportions of about $V_2N$.

BACKGROUND ART

U.S. Pat. No. 4,040,814 issued to R. F. Merkert on Aug. 9, 1977, discloses and claims a method for producing a material containing vanadium and nitrogen substantially in the form of $V_2N$ in which a mixture of $V_2O_3$ and carbon in substantially stoichiometric porportions according to the formula $V_2O_3+3C\rightarrow 2V+3CO$ is is placed in a vacuum furnace and subjected to a temperature in a range of from about 1100° C. to 1500° C. under a reduced pressure in the range from about 5 mm to 100 microns. The mixture constituents react under these conditions and evolve CO. The temperature and pressure in the furnace are maintained in the above ranges until CO is essentially no longer evolved from the mixture. Thereafter, nitrogen gas is introduced into the furnace to provide a nitrogen environment in the furnace, preferably at about atmospheric pressure, while the temperature in the furnace is maintained in the range of from about 1100° C. to 1500° C. The nitrogen reacts with the vanadium constituent in the mixture to provide from about 5 to 8% by weight nitrogen. The process is repeated by evacuating the furnace to provide a pressure of from about 5 mm to 100 microns, whereupon additional CO is evolved. Nitrogen gas is again introduced into the furnace to provide a nitrogen environment at about atmospheric pressure and nitrogen further reacts with vanadium constituent in the mixture to provide a further increase of from about 1 to 3% by weight of nitrogen. The process may be repeated one or more times until the nitrogen content of the mixture is in the range of about 10 to 12% by weight.

The aforedescribed method unfortunately suffers from the limitation in that it consumes a significant amount of power due to the intermittent vacuum and nitriting steps. In addition, the total furnace cycle time is too long. The reaction between the mixture constituents, i.e., $V_2O_3$ and carbon, is exothermic but so far there has been no attempt to utilize this reaction and reduce cycle time.

It is therefore an object of the present invention to provide an improved method for producing a vanadium- and nitrogen-containing material for use as an addition to steel.

Another more specific object of the present invention is to provide such an improved method which utilizes the energy released by the exothermic reaction between the mixture constituents to reduce power consumption and shorten furnace cycle time.

It has been discovered that the foregoing objects and advantages of the present invention can be achieved by continuously flowing nitrogen gas in the furnace while simultaneously maintaining the temperature and vacuum.

SUMMARY OF THE INVENTION

A method in accordance with the present invention comprises:

(i) providing a mixture of $V_2O_3$ and carbon in substantially stoichiometric proportions in accordance with the following formula:

$$V_2O_3+3C\rightarrow 2V+3CO$$

(ii) subjecting the mixture in a furnace to a temperature in the range of from about 1000° C. to 1500° C. under a reduced pressure in the range of from about 5 mm to 100 microns to cause reaction between mixture constituents and also the evolution of CO;

(iii) maintaining the temperature and pressure in the furnace in the respective ranges specified in (ii) while simultaneously introducing nitrogen gas into the furnace to provide a nitrogen atmosphere in the furnace until CO is essentially no longer evolved from the mixture; and (iv) subsequently cooling the mixture in a nonoxidizing environment.

DETAILED DESCRIPTION

In the practice of the present invention, $V_2O_3$ and carbon are blended in proportion in accordance with the following:

$$V_2O_3+3C\rightarrow 2V+3CO$$

The weight ratio of $V_2O_3$ to carbon is accordingly about 4:2. The blended mixture is then suitably briquetted or otherwise shaped using water and a conventional binder and dried. The dried mixture is charged to the hearth of a conventional vacuum furnace and heated to a temperature of at least about 1000° C. while applying a vacuum to the furnace to establish a reduced pressure in the range of about 5 mm to 100 microns in the furnace. Nitrogen gas is introduced to the furnace at about the same time the temperature reaches about 1000° C. The mixture constituents will begin to react and evolve CO under these conditions and the temperature in the furnace will increase to a maximum value of about 1500° C. Nitrogen gas flows substantially continuously through the furnace to provide a nitrogen environment in the furnace. The pressure in the furnace will increase due to the evolution of CO to a maximum value of about 5 mm and thereafter begin to decrease as the reaction evolves less and less CO. The evolved CO is withdrawn from the furnace along with the nitrogen gas until a minimum pressure of about 700 microns is reached. The reaction is complete at this point and no further CO should be evolved. During this period nitrogen reacts with the vanadium constituent in the mixture to provide from about 12 to 15% by weight nitrogen and the resulting material will be substantially combined vanadium and nitrogen, $V_2N$. When the reaction is complete (e.g., analysis of exhaust gas does not indicate the presence of CO), the power is terminated and the mixture is cooled with nitrogen until a temperature of less than about 200° C. is reached.

The vanadium- and nitrogen-containing material prepared in accordance with the present invention contains a relatively large percentage of nitrogen, i.e., up to about 15% by weight, and is ideally suited as an addition to steel, particularly in those applications where it is desirable to add substantially amounts of nitrogen. In addition, the vanadium and nitrogen containing material can be prepared according to the method of the present invention at a substantial savings of power and cost as compared to methods of the prior art. It should be noted in this connection that the present method takes full advantage of the exothermic reaction and reduces total cycle time since intermittent vacuum and nitriting is avoided.

The following examples will further illustrate the practice of the present invention.

EXAMPLE I

A mixture was prepared containing 100 parts by weight of $V_2O_3$ sized 65 mesh by down, 28.8 parts by weight of carbon sized 200 mesh by down, 2.5 parts by weight of Mogul binder, and 20% water. Briquets sized 1½ in. × 1¼ in. × 1 in. were prepared from the mix by pressing at 3000 psi and drying at 250° F. The resulting briquets in the amount of 28.75 pounds were charged to a vacuum furnace having interior dimensions of 40 in. × 13 in. × 5 in. The pressure in the furnace was reduced to 200 microns and the temperature was raised to 1000° C. After about 2 hours, the temperature rose to approximately 1400° C. The pressure in the furnace increased to 20 mm and after about 12 hours at 1400° C. the pressure dropped to 700 microns. Nitrogen gas was introduced in the furnace continuously from the time the temperature in the furnace reached 1000° C. until the pressure dropped to its minimum value (e.g., 700 microns) upon completion of the reaction. The nitrogen flow was maintained at about 10 cubic feet per hour and utilized about 120 cubic feet or 9.4 pounds of nitrogen. The product mixture was then cooled with nitrogen until the temperature in the furnace was below about 200° C. The product mixture analyzed 79.16% vanadium, 7.12% carbon, 0.11% oxygen and 12.65% nitrogen.

EXAMPLE II

A mixture was prepared using the same mix order as specified in Example I above. Briquets were prepared from this mixture in the same manner as described and approximately 2475 pounds were charged to a vacuum furnace. The furnace was evacuated to a minimum pressure of about 100 microns and the temperature was increased to about 1000° C. and held at this temperature for about 4 hours. Nitrogen gas was introduced in the furnace as soon as the temperature reached 1000° C. and was continued at a rate of about 21.6 lbs. $N_2$ per hour until the reaction was complete. The temperatures and pressures in the furnace were observed to vary during the test according to the following:

| Temp. °C. | Hrs. to Temp. | Hrs. Held at Temp. | Furnace Pressure | |
|---|---|---|---|---|
| | | | Max. | Min. |
| 1000 | 2 | 4 | >2mm | 100 |
| 1400 | 9 | 12 | >5mm | >2mm |
| 1400 | | 36 | 4500 | 1000 |

The product mixture was then cooled with nitrogen in the furnace for 48 hours.

The product mixture in the amount of 1546 lbs. analyzed 78.42% vanadium, 5.73% carbon, 0.93% oxygen and 14.02% nitrogen.

I claim:
1. A method for making a material containing vanadium and nitrogen substantially in the form of $V_2N$, said method comprising:
   (i) providing a mixture of $V_2O_3$ and carbon in substantially stoichiometric proportions in accordance with the following formula:

$$V_2O_3 + 3C \rightarrow 2V + 3CO$$

(ii) subjecting the mixture in a furnace to a temperature in the range of about 1000° C. to 1500° C. under a reduced pressure in the range of about 5 mm to 100 microns to cause reaction between mixture constituents and the evolution of CO;
   (iii) continuously maintaining the temperature and pressure in the furnace in the respective ranges specified in (ii) while simultaneously and continuously introducing nitrogen gas into the furnace to provide a nitrogen atmosphere in the furnace until CO is essentially no longer evolved from the mixture; and
   (iv) subsequently cooling the mixture in a nonoxidizing environment.

* * * * *